United States Patent [19]

Bearden et al.

[11] Patent Number: 5,260,562

[45] Date of Patent: *Nov. 9, 1993

[54] HIGH-RESOLUTION LIGHT MICROSCOPE USING COHERENT LIGHT REFLECTED FROM A TARGET TO MODULATE THE POWER OUTPUT FROM A LASER

[75] Inventors: Alan J. Bearden, Berkeley; Michael P. O'Neill, Orinda, both of Calif.

[73] Assignee: Regents of the University of California, Berkeley, Calif.

[*] Notice: The portion of the term of this patent subsequent to Jul. 2, 2008 has been disclaimed.

[21] Appl. No.: 675,794

[22] Filed: Mar. 24, 1991

Related U.S. Application Data

[63] Continuation-in-part of Ser. No. 414,879, Sep. 29, 1989, Pat. No. 5,029,023.

[51] Int. Cl.$^5$ .......................... H01J 3/14; G11B 7/00
[52] U.S. Cl. ...................... 250/216; 356/237
[58] Field of Search ............ 250/201.3, 561, 562, 250/571, 572, 216; 356/237, 376, 356, 357, 358, 355, 398, 359, 4, 4.5, 5; 369/69

[56] References Cited

U.S. PATENT DOCUMENTS

| | | | |
|---|---|---|---|
| 3,409,370 | 11/1968 | King et al. | 356/51 |
| 3,643,015 | 2/1972 | Davidovits et al. | 178/68 |
| 3,901,597 | 8/1975 | White | 356/398 |
| 4,011,748 | 3/1977 | Bond et al. | 73/67.6 |
| 4,130,360 | 12/1978 | Courtenay | 356/4 |
| 4,630,276 | 12/1986 | Moran | 372/15 |
| 4,760,385 | 7/1988 | Jansson et al. | 340/709 |
| 4,806,778 | 2/1989 | Yamamoto et al. | 356/373 |
| 4,902,966 | 2/1990 | Brust et al. | 324/158 R |
| 5,029,023 | 7/1991 | Bearden et al. | 356/356 |

OTHER PUBLICATIONS

Clunie, D. M., and Rock, N. H., J. Sci. Instrum. 41:489–492 (1964).
Sarid, D., et al., Optics Letters 13(12):1057–1059 (1988).
"Science in British Industry," New Scientist 323:180 (1963).

*Primary Examiner*—David C. Nelms
*Assistant Examiner*—John R. Lee
*Attorney, Agent, or Firm*—Peter J. Dehlinger

[57] ABSTRACT

An optical microscope for examining surface features of a target surface, at a resolution, in one dimension, in the picometer-to-nanometer range. The microscope includes a laser for use in producing a coherent output light beam, a lens for focusing the output beam onto a target, and a photodetector for measuring the power output of the beam. The focused beam is moved relative to the target surface in a defined position-dependent pattern, with a portion of the light reflected from the target surface being reflected back into the laser. Changes in the measured power of the laser are converted to position-dependent surface displacements, in the direction of the output beam.

7 Claims, 6 Drawing Sheets

HIGH-RESOLUTION LIGHT MICROSCOPE USING COHERENT LIGHT REFLECTED FROM A TARGET TO MODULATE THE POWER OUTPUT FROM A LASER

This application is a continuation-in-part of copending application Ser. No. 07/414,879, filed Sep. 29, 1989, now U.S. Pat. No. 5,029,023.

1. Field of the Invention

The present invention relates to a high-resolution light microscope.

2. Background of the Invention

A. High-Resolution Microscopy

High-resolution surface mapping, in the nanometer/picometer range, can be carried out by scanning tunnelling microscopy or atomic force microscopy (P. K. Hansma et al., Science 1988; 242: 209–216). However, both of these approaches require costly, high precision equipment, and are limited to measuring static surface features.

Scanning electron microscopy (SEM), which is widely used for photographing surface features of a 3-dimensional object, has a potential surface resolution in the 1.0 nm ($10^{-8}$ meter) range. SEM, however, requires a highly sophisticated and expensive electron beam source and focusing equipment, and a static sample which must be maintained in a vacuum chamber.

It would therefore be desirable to provide a simple optical surface mapping device capable of achieving resolution down to the picometer range. It would be further desirable to achieve such resolution on a sample that can be viewed without special surface treatment or dehydration, as is required for current high-resolution surface mapping methods, and to be able to map features within a transparent structure, such as a biological cell.

SUMMARY OF THE INVENTION

It is a general object of the invention to meet the desired objectives stated above.

The invention includes, in one aspect, an optical microscope for examining features of a target which are related to depth displacements at which index of refraction changes produce reflection of coherent light, at a depth resolution in the picometer-to-nanometer range. The microscope includes a stable-resonator laser having a resonator cavity, for use in producing a coherent output light beam, a lens for focusing the output beam onto the target, and a photodetector for measuring the power of the output beam. In operation, the beam is moved relative to the target surface in a defined manner, and the output beam power is measured as a function of target position. The measured beam power, as a function of target position, is then used to determine surface-normal displacements (in the direction of the output beam), in the target.

In one embodiment, the microscope is designed to provide a mapping of both changes in reflectance and surface-normal displacements over the target. In this embodiment, the beam is moved successively to different surface regions of the target, and at each region, the target is moved along the beam axis until maximum and minimum laser power levels are observed. The difference between the two levels is then used to determine a reflectance value for that region. This information is used to map the reflectance characteristics over the target surface, and further used to subtract out reflectance effects from surface displacement effects, for producing a surface map that depends only on surface displacement effects.

In another aspect, the invention includes a method of mapping such surface features in a target, by directing a focused laser beam onto the target surface, and measuring position-dependent changes in laser output as the beam is moved relative to the target surface.

These and other objects and features of the invention will become more fully apparent when the following detailed description of the invention is read in conjunction with the accompanying drawings.

DETAILED DESCRIPTION OF THE INVENTION

I. High-Reolution Optical Microscope

Figure 1:
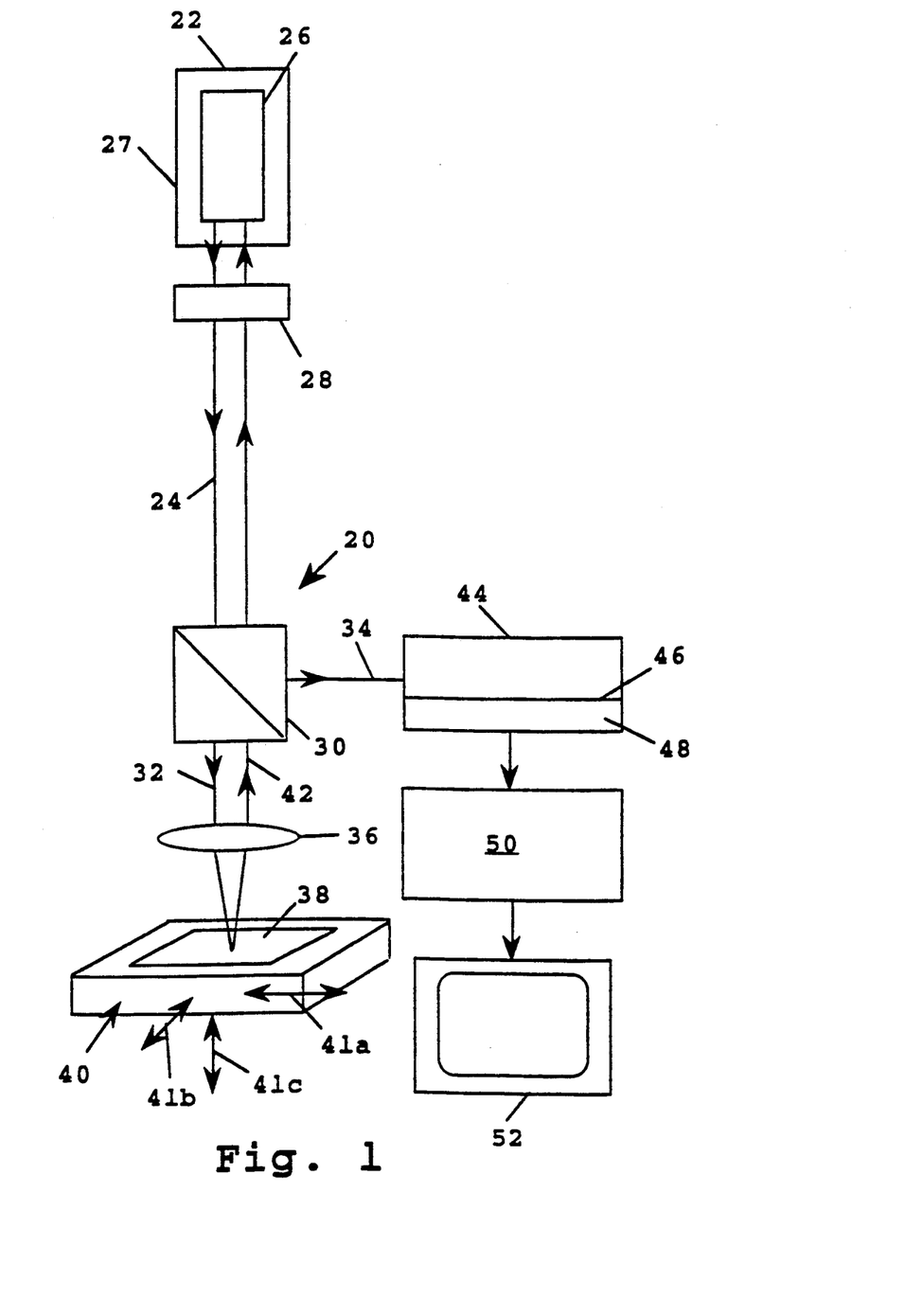
FIG. 1 is a simplified schematic view of a microscope constructed according to one embodiment of the invention.

FIG. 1 is a schematic diagram of a high-resolution optical microscope 20 constructed according to one embodiment of the invention. The microscope generally includes a stable-resonator laser 22 designed to produce a coherent light beam 24. The laser, which may be of conventional design, includes a resonator cavity 26 within a housing 27, and internal optical and circuit features (not shown).

One preferred type of laser is a low-power He-Ne gas laser operating in two longitudinal modes, each of which is linearly polarized. An internal linear polarizer blocks the passage of one of the two modes, so that only a single linearly polarized low-power beam is available externally. One laser of this type which is suitable commercially available is a Uniphase Model 1101P He-Ne single-mode gas laser (Uniphase, San Jose, Calif.). Where it is desired perform target mapping at target vibrations in the 10–100 MHZ range, as described below, a semiconductor laser, such as are commercially available, may be used.

In the present embodiment, where the laser output is linearly polarized, the beam is passed through a half-wave plate 28 which allows the direction of linear polarization to be rotated in a plane perpendicular to the output beam. This effect can also be achieved by rotating the laser itself. Following the half-wave plate, the beam is split by a polarization-dependent beam splitter 30 which passes the component of linear polarization parallel to the plane of incidence straight through, and deflects by 90° light whose linear polarization is normal to the plane of incidence. The portion of the laser output beam which is passed through the beam splitter is also referred to herein as an incident beam, and is indicated at 32 in FIG. 1. The portion of the laser output beam which is deflected by the beam splitter is also referred to herein as a secondary beam, and is indicated at 34 in the figure.

An adjustable-position objective lens 36 in the microscope is used to focus beam 32 onto a target 38 whose features are to be mapped, in accordance with the invention. The lens is preferably a 10 to 100 power lens having a numerical aperture between about 0.6 and 1.2. The focused beam preferably has a beam diameter of between about 0.5 and 2 microns at the focal point of the lens, and the depth of focus of the beam is preferably between about 1–2 microns. The lens is also referred to herein as means for focusing the laser output beam onto a target.

The target is supported on a movable stage 40 designed for moving the target in a manner which allows the focused light beam to "scan" the target. That is, the target is moved in a systematic, preferably time-dependent manner in the x-y plane (the plane normal to the beam axis) which brings each region of the target to be viewed into the focused beam. The stage is also designed for small-displacement oscillation or slow displacement in the z direction, i.e., the direction of the beam.

In the embodiment shown, the stage is moved by x, y, and z micrometer heads,, indicated by arrows 41a, 41b, and 41c, respectively. These heads can be controlled by a DC voltage input, according to standard operation.

Alternatively, or in addition, controlled movement of the stage can be performed by piezoelectric transducers, such as indicated also by arrows 41a, 41b, and 41c, which may be driven for slow controlled movement in a selected x, y, or z direction by a DC input, and which may be driven by an AC signal for oscillation in a desired direction and at a selected frequency. In one preferred operating mode, the target is vibrated in the z direction by a piezoelectric transducer (indicated by arrow 41c) at a selected frequency in the KHz-MHz range. The amplitude of vibration is preferably less than 100 nm. The purpose of the vibration is to avoid the problem of 1/f DC power noise, by recording fluctuations in laser power output on a high-frequency AC "carrier," as seen below.

The stage and the movement effectors indicated by arrows 41a, 41b, and 41c are also referred to herein, collectively, as means for moving the focused beam relative to the target in a defined pattern. It will be appreciated that the moving means could alternatively include a movable lens assembly for scanning the beam over the target in a defined pattern, according to known lens assembly construction and operation.

When the incident beam strikes the target, a coherent reflected light beam 42 is reflected by the target back along the path of the incident light beam. (The incident and back reflected beams, which are coincident light beams, are shown as separate lines in FIG. 1 only for the sake of clarity.) This back-reflected beam is transmitted by the beam-splitter and reenters the optical resonator cavity of the laser, as indicated in the figure. The light that reenters the cavity interferes with the standing wave distribution of light in the cavity, and this interference, which depend on the phase of the back-reflected light, changes the output intensity of the laser.

The phase of the reflected light beam varies according to displacements, along the beam axis, between the laser and the region in the target at which reflection is produced. These regions of reflection may correspond to reflecting regions on the target surface, or they may correspond to subsurface features, below a transparent surface, where a change of index of refraction produces light reflection. Such displacements can be measured in the picometer/nanometer range, and more specifically in the range from about 1 picometer ($10^{-12}$ meters) up to about one-fourth of the laser beam wavelength, that is, up to about one hundred nanometers ($10^{-7}$ to $10^{-6}$ meters, nm). Even greater resolution, down to about 0.1 picometer, is theoretically possible by limiting laser fluctuation noise, detector noise, and apparatus vibrational effects, as noted below.

The retroreflected light beam 42 which enters the laser cavity is preferably only a small portion of the incident beam, typically about 0.1% or less of the total incident-beam power. This level is achieved, generally, where the target gives diffuse, non-specular reflection, that is, where the target has rough or irregular surface or subsurface reflecting features prevent reflection from a common plane and at a common reflection angle. For a target which gives specular reflection, the level of retroreflected light can be reduced to a desired low level, in one approach, by tilting the plane of the target, so that the back reflected light beam which enters the laser, i.e., the retroreflected light beam, represents diffuse reflection from the surface. Alternatively, the back reflected light beam may be passed through a half-wave plate and beam-splitter or through a neutral density filter before reaching the laser, to produce the desired power attenuation in the retroreflected beam.

The secondary beam from the laser is directed onto a photodetector 44 designed to measure the power of the laser output beam, by measuring the power of the deflected, secondary beam. The photodetector includes a silicon photodiode 46 which is designed to measure light intensity. One suitable type of photodiode is an EG&G SGD 100-A silicon photodiode.

The photodiode is connected to an operational amplifier 48 in the photodetector which outputs a DC component voltage which is linearly proportional to the power of the light beam detected by the photodiode. The operational amplifier characteristics are such that the voltage signal output which is typically obtained is in the microvolt/millivolt range. The photodetector is also referred to herein as means for measuring the power output of the laser output signal.

The microscope also includes a processing unit 50 for converting position-dependent changes in the power output measured at the photodetector, as the beam is scanned over the target, to position-dependent displacement information. To this end, the unit records the laser power (photodetector voltage) as the focused laser beam is scanned over the target, associates each measured power with the corresponding region of the target which produced that power, then assigns that target region a given displacement value, according to the measured laser power. From this data, a displacement map of reflecting regions of the target is constructed, for display at a suitable display device 52 in the microscope.

The operation of the unit 50 will be described below with reference to FIG. 9. As will be seen, the microscope can be operated in a mode in which both displacement and reflectance maps of the target can be constructed from the laser power output information which is recorded at unit 50.

Figure 2:
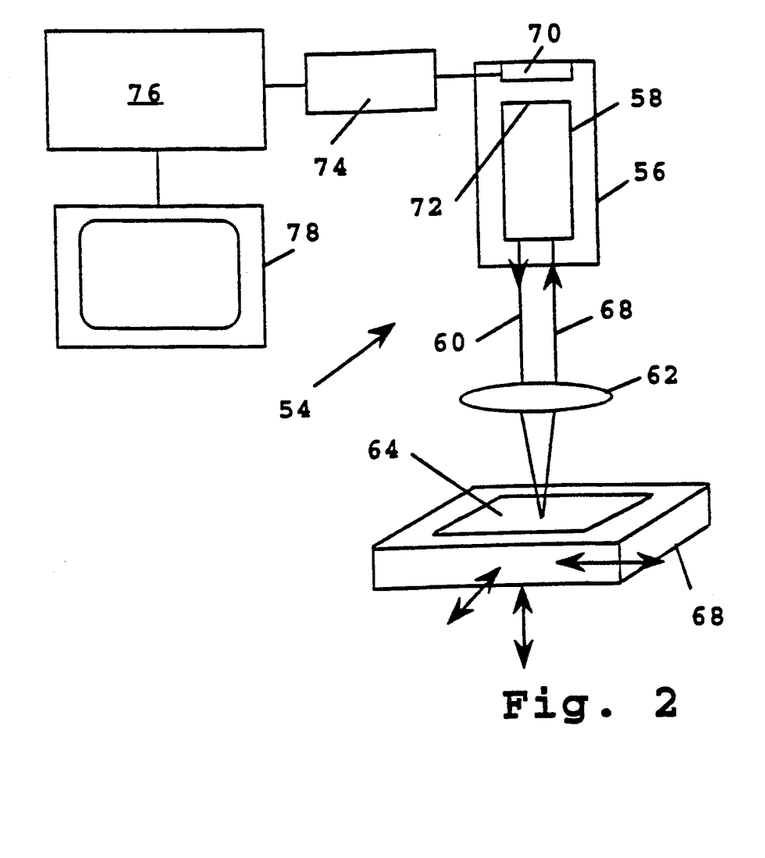
FIG. 2 is a simplified schematic view of a microscope constructed according to another embodiment of the invention.

FIG. 2 illustrates a microscope 54 constructed according to a second embodiment of the invention. The microscope includes a laser 56 having a cavity 58, for producing a coherent output beam 60, and an adjustable-position lens 62 for focusing the beam on a target 64, carried on a movable stage 66. The laser, lens, and stage components are similar to those described above. A back-reflected light beam 68 from the target is directed into the laser cavity, to modulate laser power output as described above.

Microscope 54 differs from microscope 20 in that the power output of the laser is measured directly from the laser cavity. To this end, a photodetector 70 is positioned behind the rear of the cavity, as shown, for measuring the intensity of light leaking through a mirror 72 at the rear of the cavity. The photodetector is also referred to herein as means for measuring the power output of the laser.

The photodetector signal is amplified by an amplifier 74, and the amplified signal is passed to a processing unit 76 operable to convert position-dependent changes in laser output, as the focused laser beam is scanned over the surface, to position-dependent displacements of the reflecting regions of the target, as described above. A displacement map of target reflecting regions constructed from this data may be displayed on a display device 78.

Figure 3:
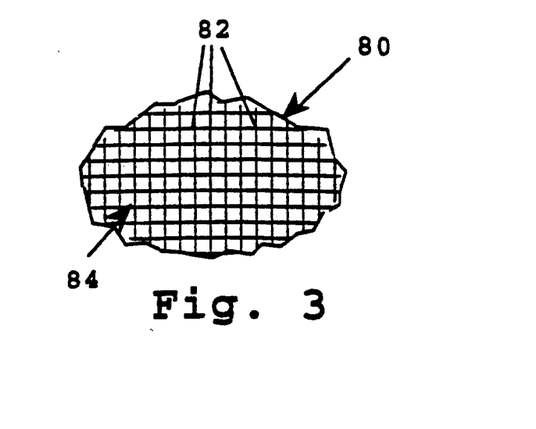
FIG. 3 is an enlarged plan view of a multi-cell photodetector which may be used in the microscope of the invention.

FIG. 3 shows a fragmentary portion of a photodetector 80 which may be used in either of the above microscope embodiments, for measuring power or intensity characteristics of different regions of the laser output beam. The detector has a grid or matrix of photodetector elements, such as elements 82, which collectively define a detecting surface 84 corresponding approximately to the area of the output laser beam being detected. It will be appreciated that the grid of detector elements can detect power variations within the cross-section of the beam, if desired.

II. Surface Mapping Resolution

Figure 4:
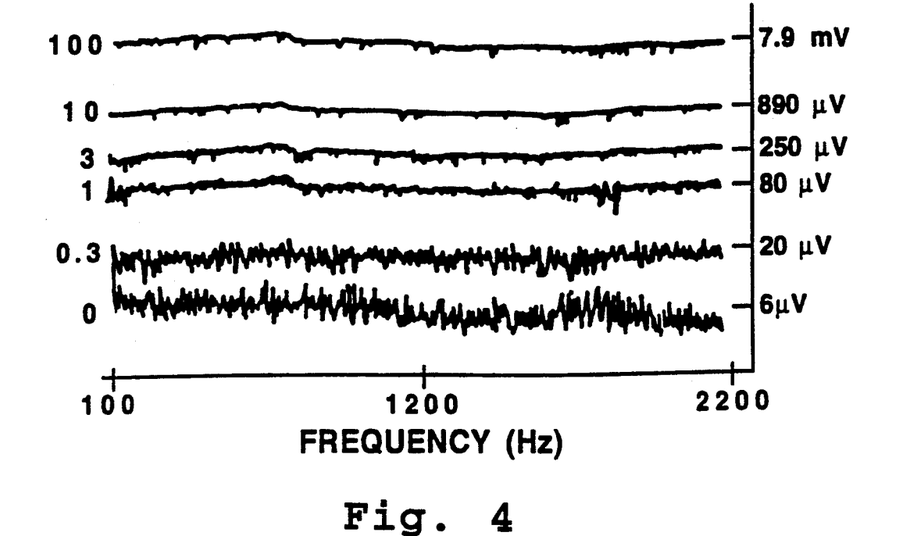
FIG. 4 shows spectra of laser power variations produced by target surface vibrations, as measured at several vibration amplitudes, indicated at the left of the spectra in nanometers, and over vibrational frequencies between 200–2200 Hz.

FIG. 4 illustrates the ability of the microscope of the invention to detect surface displacements in the direction normal to the surface. The target here is attached to a commercially available piezoelectric transducer (PZT) having a response of about 4.4 nm displacement/V. A stiff paper card was attached to the surface of the transducer to serve as the vibrating target surface. Voltages from a sine-wave oscillator (10 Hz to 20 kHz) or the synchronized sweep frequency output from an audio spectrum analyzer (Hewlett-Packard 3580A) were used to drive the transducer directly or through an amplifier for the larger motional amplitude ranges.

The PZT vibration amplitude is shown at the left axis in FIG. 4, and the corresponding power output in voltage units, along the right axis. For each voltage applied to the transducer the frequency was swept or varied from 200 Hz to 2.2 kHz. The flatness of the traces indicates the flat response of the piezoelectric over the range of driving frequency.

It can be appreciated from the spectra shown in FIG. 4 that the amplitude of the measured signals is linearly related to the amplitude of the transducer vibrations. For example, with reference to the two spectra at the top in FIG. 4, a tenfold increase in vibration amplitude (from 10 to 100 nm) corresponds to an approximately ten-fold increase in detected laser output measured as a voltage; similarly, a 100-fold increase in vibration amplitude yields an approximately 100-fold increase in measured voltage. The noise in the spectra for vibration amplitudes below 1 nm is due to background electronic noise and random laser light beam output variations. Similar results were obtained when the target surface was a transducer covered with brushed steel, plastic, and mylar.

The signal-to-noise ratio as monitored by the output of the operational amplifier is due to laser-light intensity fluctuations and electronic noise in the photodetector. The exact noise voltage at the output of the current-to-voltage electronics depends on the specific laser's amplitude fluctuations, the detector and its associate circuitry, and on the bandwidth of the measurement. For the bandwidth of the circuit used, the noise voltage was 2 microvolts, giving a signal-to-noise ratio of at least 40 dB.

Figure 5:
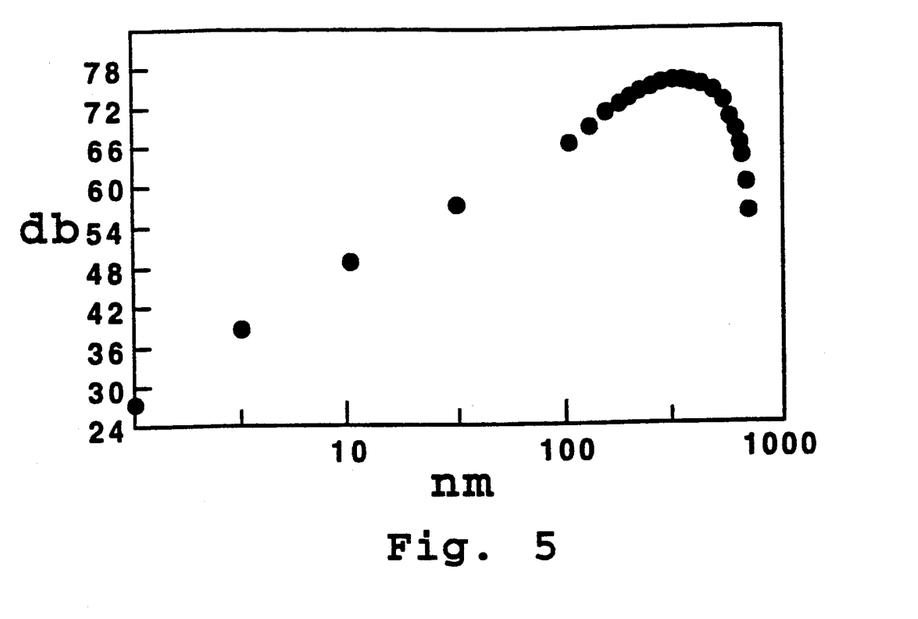
FIG. 5 shows a plot of peak power fluctuation at a fixed frequency, as a function of increasing peak amplitudes of vibration.

In the method described above, displacement measurements down to the 10 picometer range have been made. The limiting noise in the apparatus is due predominantly to laser amplitude fluctuations, which in theory can be reduced by up to two orders of magnitude. It is also noted that detector noise levels down to $10^{-2}$ pm/(Hz)$^{-\frac{1}{2}}$ have been reported (D. Rugar et al., Rev. Sci. Instru., 59:2337, 1988). Thus, assuming that mechanical vibrations in the microscope can be reduced sufficiently, the microscope should be able to detect position-dependent surface displacements down to the 0.1-1 picometer range, particularly by employing phase-lock or time-averaging signal-to-noise improvement techniques. The range of linearity with respect to amplitude can be determined by keeping the frequency constant as the amplitude is varied and plotting the power output (voltage) vs. amplitude as in FIG. 5. The linear relationship holds over a range of vibration amplitudes extending below about one quarter of the incident light's wavelength. For vibration amplitudes greater than this upper limit, the relationship becomes non-linear. However, as seen below, the relationship between vibration amplitude and measured laser power output in the high-amplitude range is still predictable, and therefore useful in determining large-amplitude displacements from the measured power output fluctuations of the laser. For a He-Ne laser, the wavelength of emitted light is 632 nanometers; thus, the range of linearity (taking background noise into consideration) extends up to about 150 nm.

Figure 6:
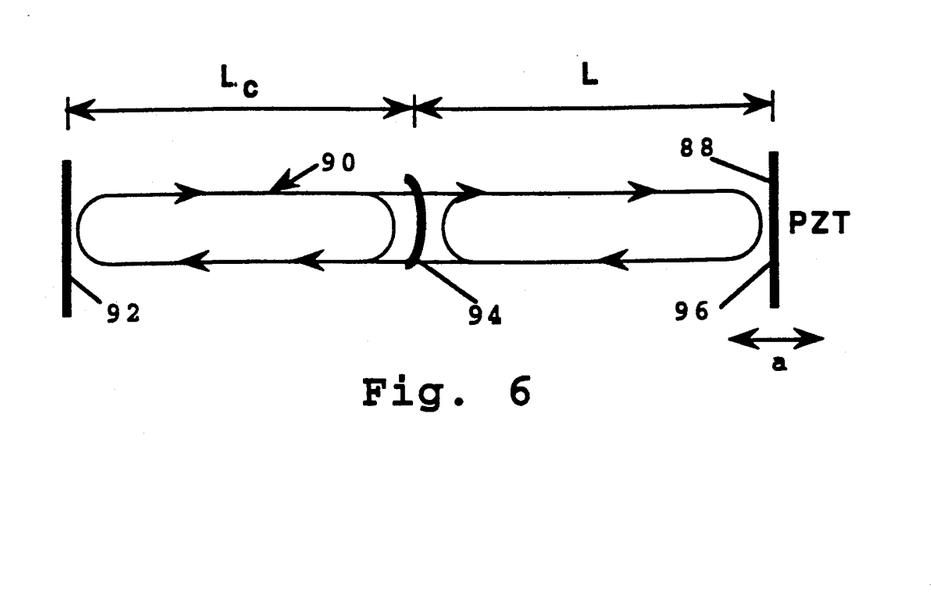
FIG. 6 shows a theory parameter diagram of an experimental configuration used for measuring laser power output as a function of displacement of a piezoelectric transducer.

FIG. 6 is a theory parameter diagram of an experimental configuration used for measuring laser power output as a function of displacement of a piezoelectric transducer (PZT) 88. Here $L_c$ represents the length of the laser cavity 90, defined by the two mirrors 92 and 94, and L represents the distance between mirror 94 and a reflecting surface 96 carried on the PZT. Experimentally, the PZT was placed 20 cm from the laser exit port, and was driven by a DC signal from a PZT high-voltage amplifier, or a 40 Hz AC sine wave signal coupled to the amplifier. A Silicon photodetector (not shown) was operated in the photovoltaic mode so that its voltage output was linearly proportional to the light intensity input. The detector was positioned at the rear of the laser head where a hole had been drilled to allow light to escape from the approximately 99% reflecting back mirror. The voltage signal from the photodetector was sent either directly to an x-y recorder for plotting of the laser intensity DC variation or to the recorder via a phase sensitive lock-in amplifier for plotting the magnitude of the AC variation.

In a first study, the surface of the PZT was moved slowly towards the laser (i.e. L decreased) and the output of the photodetector was observed. The voltage output was a DC signal with sinusoidal variation. The sinusoid went through one period as the PZT moved one half-wavelength of the laser light (316.4 nm). This behavior was observed for three different surfaces: the polished surface of a silicon chip, the rough backside of that chip, and the brushed stainless steel surface of the PZT. The amplitudes of the sinusoid as a percentage of the total signal from the photodetector were 47%, 1.3% and 0.3% respectively, for the three surfaces.

In a second study, the PZT was oscillated about a distance L with a fixed amplitude and frequency while L was slowly decreased. The output of the amplifier, at the oscillation frequency of the PZT (40 Hz) showed a sinusoidal variation with full period corresponding to movement of the PZT of a half-wavelength toward the laser. For the above-mentioned three surfaces, the signal strengths as a percentage of the average signal from the PD were 13%, 0.13%, and 0.25%, respectively, and 0.04% for the surface of a stiff paper card.

Figure 7:
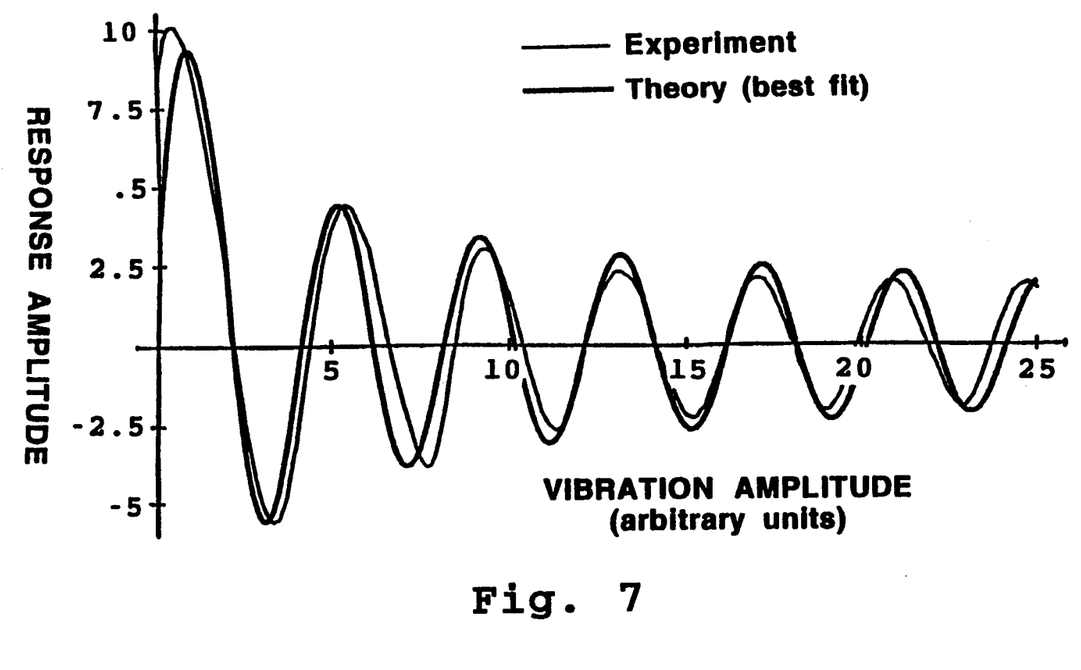
FIG. 7 is a plot of laser power amplitude as a function of oscillation amplitude of a target (light line) and calculated from theory (dark line)

In a third study, the amplitude of the oscillation over a range of approximately 3 wavelengths (1.9 $\mu$m) was varied, at a fixed frequency and fixed L. The amplitude of the signal from the amplifier, as a function of PZT vibration amplitude is shown in light line in FIG. 7. The response amplitude shows a Bessel function behavior (solid line), as predicted from laser resonant cavity analysis. (not shown).

III. Surface Reflectance Effects

As indicated above, a variety of surfaces having different roughnesses and reflectances were examined for displacement effects using the microscope of the invention. One interesting finding is that even surfaces with high surface roughness, such as a file card, which may have a surface roughness corresponding to several wavelengths, give measurable displacement effects in the nm or lower range.

One explanation of this phenomenon is that the resonance modulation effect due to the phase of back reflected light is responsive to a weighted average of the wavelets produced by reflection from othe various reflecting planes in the target region. The phenomenon represents an important aspect of the invention, since it allows for high-resolution displacement measurements on target surfaces with a wide range of surface roughness, reflectance of a surface; does, however, effect the amplitude of the laser output response to displacements at the surface. In the third study reported above, it was found that by placing calibrated neutral-density filters between the laser output and the reflecting surface, the peak signal varied as the square root of the reflectivity.

Thus, at least within a wide range of reflectivities, the contribution of reflectance to the laser output level can be approximated from some determinable function, such as a function which approximates laser response as a square root of reflectivity. This function in turn can be used to determine reflectivity of a target surface, by determining the amplitude of laser power response, over a quarter wavelength (between a maximum and minimum power response).

IV. Surface Mapping Method

Figure 8:
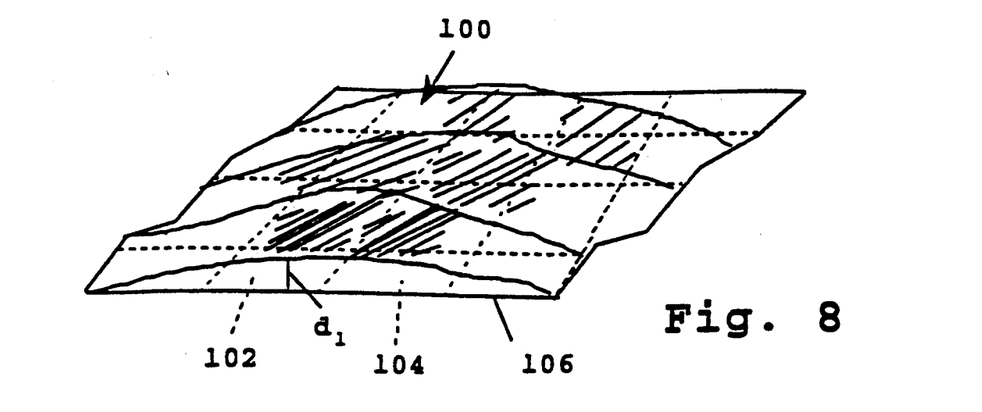
FIG. 8 is a fragmentary perspective view of a surface which is to be mapped by the microscope of the invention.

FIG. 8 shows a portion of a target 100 which has been partitioned into a grid of regions, such as regions 102, 104, which correspond in area approximately to the size of the focused laser beam used in examining the target. Each region has a reflection surface which is displaced some given distance, such as $d_1$ in region 102, above a reference plane, indicated at 106. In addition, the reflectance of the target surface may vary from region to region, as indicated by the different levels of shading in the figure.

Figure 9:
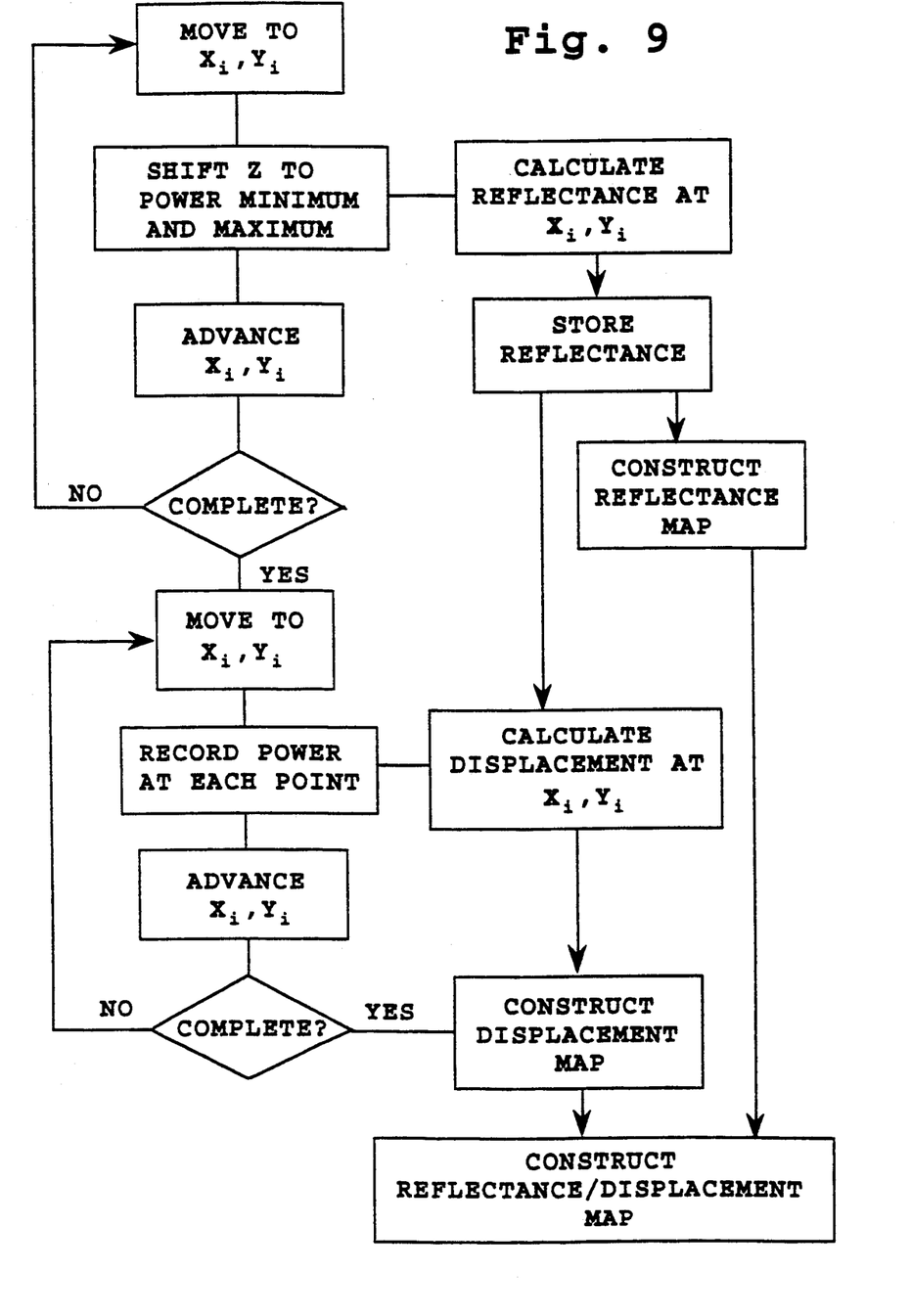
FIG. 9 is a f low diagram of surface mapping steps employed in one embodiment of the microscope of the invention, for mapping both surface reflectance and surface displacements.

FIG. 9 is a flow diagram of one operating mode of the microscope, for use in mapping both surface displacements and reflectance, such as in target 100. Initially, the focused beam is placed at a region $x_i$, $y_i$, such as region 102, in the figure. The target stage is then shifted at least ¼ wavelength along the z axis until minimum and maximum laser power levels are recorded. This shifting may be effected by a DC input into an electrically driven micrometer head or piezoelectric transducer, or by a piezoelectric transducer rapidly vibrating at a ¼ wavelength amplitude. As discussed above, the measured amplitude difference at minimum and maximum laser power outputs can be used to determine the reflectance from that region, according to a predetermined relationship between amplitude of power output variation and reflectance. This difference value is stored in a buffer, for later use in constructing a reflectance map of the target and/or for correcting displacement measurements for differences in surface reflectance.

The stage is now moved to an adjacent region, e.g., $X_{i+1}$, $Y_i$, and the procedure for determining the reflectance value at this new region is repeated, and the reflectance value is stored in the above buffer. The procedure is repeated until the entire target has been scanned. From the reflectance values which are calculated from each region, the processing unit in the microscope, such as unit 50 in microscope 20, generates a target reflectance map.

For displacement measurements, the stage is preferably oscillated at a selected frequency about a fixed distance $Z_0$ from the laser, where the amplitude of oscillation is substantially less than the expected target displacements which are to be measured. The stage is now moved in the x-y plane to scan the focused beam over each region. At each region, the laser power level is measured, and an appropriate correction for measured reflectance at that region is applied to determine displacement with respect to the reference plane, such as plane 106 in FIG. 8. The corrected displacement value is stored in a buffer, as indicated.

From the displacement values which are calculated from each region, the processing unit in the microscope, such as unit 50 in microscope 20, generates a target displacement map. The reflectance and displacement values determined for each region can be combined into a single surface map.

It can be appreciated from the foregoing how various advantages and features of the invention are met. The microscope provides high resolution (down to the low picometer range) in an optical system, and thus avoids special sample coating and/or dehydration procedures required in electron tunnelling or scanning electron microscopes. This allows a variety of samples, such as living cells, to be examined at high resolution.

The microscope is able to map surface displacement features in a target having a reflecting surface, or subsurface reflecting features in a target having a transparent surface. In addition, and according to an important advantage of the invention, the microscope can make accurate distance displacement measurements, in the picometer to nanometer range, on surfaces whose roughness may encompass several wavelengths variation. The microscope can obtain surface (or subsurface) reflectance information, and this can be used for constructing surface reflectance maps and correct the displacement map data.

Although the invention has been described with respect to particular embodiments and applications, it will be apparent to one skilled in the art how the method and apparatus of the invention can be modified or adapted to a variety of other applications.

It is claimed:

1. An optical microscope for mapping features in a target which are related to depth displacements at which index of refraction changes produce reflection of coherent light, at a depth resolution in the picometer-to-nanometer range, comprising:
   a stable-resonator laser having a resonator cavity, for use in producing an emitted coherent output light beam,
   means for focusing said output beam onto such target substantially in a plane where such features are present, and allowing coherent light reflected from the target surface to enter the laser cavity,
   a stage for supporting the target,
   means for moving the focused output beam relative to the target surface in a defined, time-dependent manner,
   means for measuring the power of said output beam, and
   means operatively connected to said moving means and said measuring means for converting position-dependent changes in the measured power of said output beam to position-dependent displacements in the depths at which reflection occurs on the target surface.

2. The microscope of claim 1, for mapping surface features of target having a diffuse, non-specular reflecting surface.

3. The microscope of claim 1, which further includes vibrating means for vibrating said stage at a selected amplitude in the picometer-nanometer range in a direction having a component normal to said target surface, and said converting means is designed to determine position-dependent changes in laser output f rom the known position of the beam with respect to the target surface.

4. The microscope of claim 1, for use in examining differences in the reflective properties over the target surface, which further includes means for adjusting, at each of the different target surface positions, the distance between the target surface position and focusing means until the change in output beam power is a minimum, and said converting means is effective to convert the time-dependent changes in the measured power of said output beam to position-dependent displacements and differences in reflectance over the target surface.

5. The microscope of claim 1, wherein said means for measuring the power of said output beam includes a matrix of photodetectors effective to measure differences in the power of different cross-sectional regions of the output beam.

6. A method for mapping features in a target which are related to depth displacements at which index of refraction changes produce reflection of coherent light, at a depth resolution in the picometer-to-nanometer range, comprising
   focusing onto the target surface, a coherent light beam produced by a stable-resonator laser having a resonator cavity,
   allowing coherent light reflected rom the target surface to enter the laser cavity, thereby to modulate the power output of the laser according to the distance between the laser cavity and the reflecting surface.
   vibrating the target in a direction having a component normal to the target surface,
   moving the beam relative to the target surface,
   measuring position-dependent changes in the laser power output, and
   converting position-dependent changes in the measured power of said output beam to position-dependent displacements in the depths at which reflection occurs on the target surface.

7. The method of claim 6, for use in examining differences in the reflective properties over the target surface, which further includes adjusting, at each of the different target surface positions, the distance between the target surface position and focusing means until the change in output beam power is a minimum, and said converting includes converting time-dependent changes in the measured power of said output beam to position-dependent displacements and differences in reflectance over the target surface.

* * * * *

UNITED STATES PATENT AND TRADEMARK OFFICE
CERTIFICATE OF CORRECTION

PATENT NO. : 5,260,562

DATED : Nov. 9, 1993

INVENTOR(S) : Alan J. Bearden and Michael P. O'Neill

It is certified that error appears in the above-identified patent and that said Letters Patent is hereby corrected as shown below:

Col. 1, line 25, delete "1.0 nm" and insert --10 nm--.

Col. 2, line 67, between "desired" and "perform", insert --to--.

Col. 7, line 65, after "roughness" insert a period [.]; change "reflectance" to --Reflectance--; after "surface" delete the semicolon.

Signed and Sealed this

Twenty-fourth Day of May, 1994

Attest:

BRUCE LEHMAN

Attesting Officer        Commissioner of Patents and Trademarks